United States Patent [19]

Mori et al.

[11] 4,160,364

[45] Jul. 10, 1979

[54] INTERNAL COMBUSTION GASOLINE ENGINE

[75] Inventors: Haruo Mori, Tokyo; Tadashige Ueda; Isamu Endo, both of Musashino, all of Japan

[73] Assignee: Fuji Jukogyo Kabushiki Kaisha, Tokyo, Japan

[21] Appl. No.: 822,620

[22] Filed: Aug. 8, 1977

Related U.S. Application Data

[63] Continuation of Ser. No. 605,145, Aug. 15, 1975, abandoned.

[30] Foreign Application Priority Data

Sep. 12, 1974 [JP] Japan ............................ 49-105360

[51] Int. Cl.² ............................................. F01N 3/10
[52] U.S. Cl. ........................................ 60/293; 60/305
[58] Field of Search ................ 60/282, 290, 289, 293, 60/900, 304, 305; 123/90.15

[56] References Cited

U.S. PATENT DOCUMENTS

| | | | |
|---|---|---|---|
| 3,577,727 | 5/1971 | Warren | 60/292 |
| 3,662,541 | 5/1972 | Sawada | 60/293 |
| 3,714,932 | 2/1973 | Meacham | 123/90.15 |
| 3,906,722 | 9/1975 | Garcea | 60/293 |
| 3,946,558 | 3/1976 | Beekhuis | 60/282 |

*Primary Examiner*—Douglas Hart
*Attorney, Agent, or Firm*—Martin A. Farber

[57] ABSTRACT

An exhaust gas purification system for internal combustion engines having at least two cylinders of which the port of each exhaust valve communicates with a port passage provided in the cylinder head, and a pair of the adjacent port passages communicate with a common port passage forming a siamese port passage therewith. A secondary air intake passage having a check valve communicates with the port passages for introducing secondary air by exhaust pulsation. In order to enhance the exhaust pulsation effect, the exhaust pipe connected to the opening of the common port passage has a constant cross section of a fixed diameter. Heat insulation is provided along the siamese port passage and a portion of the exhaust pipe for good oxidation of the unburned constituents. The total volume of the exhaust passage through the siamese port passage and the heat insulated exhaust pipe portion is equal to the displacement volume of the corresponding cylinders for introduction of a sufficient amount of the secondary air. The ignition timing is retarded to restrict the combustion temperature to under 2000° C. for reducing the amount of nitrogen oxides.

4 Claims, 6 Drawing Figures

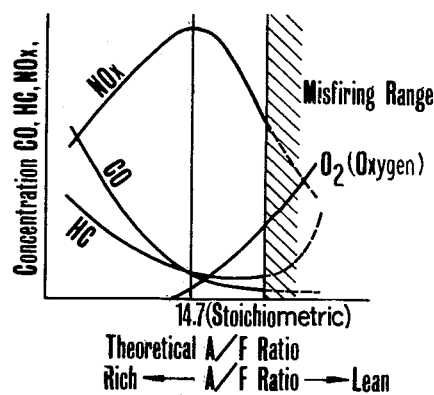
FIG. 3.
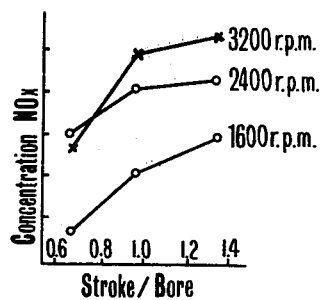
FIG. 4.
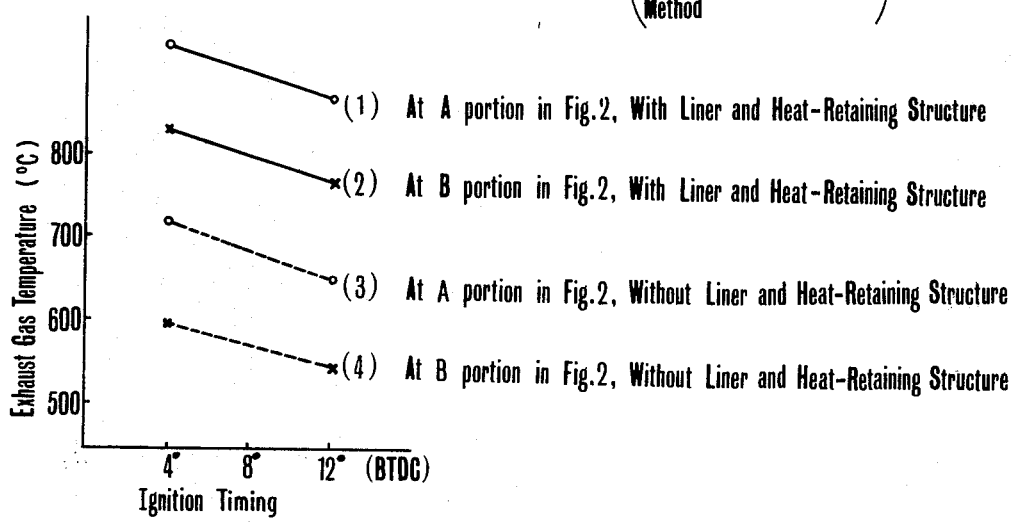
FIG. 6. (Exhaust Gas Temperature According to 10M Measuring Method)
(1) At A portion in Fig. 2, With Liner and Heat-Retaining Structure
(2) At B portion in Fig. 2, With Liner and Heat-Retaining Structure
(3) At A portion in Fig. 2, Without Liner and Heat-Retaining Structure
(4) At B portion in Fig. 2, Without Liner and Heat-Retaining Structure

INTERNAL COMBUSTION GASOLINE ENGINE

This is a continuation of application Ser. No. 605,145, filed on Aug. 15, 1975, now abandoned.

FIELD OF THE INVENTION

This invention relates to improvements in an internal combustion gasoline engine and more particularly to a new and improved internal combustion gasoline engine for reducing pollutants in exhaust gas to a predetermined level.

THE PRIOR ART

Many exhaust emission control devices have been proposed for meeting the strict emission regulations. These conventional devices may generally be classified into two categories. One is that an engine body itself is modified for clarifying the poisonous exhaust gas. The other features in that the exhaust gas is treated for clarification in the exhaust system following the engine body. The stratified combustion system in which a combustion chamber is further provided with another combustion chamber, belongs to the former category. For example, an exhaust emission control in which a device for further burning the poisonous exhaust gas is provided in the exhaust system, and one in which a catalytic converter system for promoting the clarification of the exhaust gas is additionally provided in the exhaust system are included in the latter category of the conventional exhaust emission control devices.

The stratified combustion system of the engine is complicated in engine structure due to the fact that an additional combustion chamber and an intake valve are provided, and is also complicated in the control of the mixture ratio because of stratified charging. Thus, this system is defective in that it is difficult to keep the necessary reliability during operation and control as compared with the conventional systems and special maintenance is required.

The exhaust emission control device of the latter case accompanied by the thermal reactor or catalyst device suffers from many disadvantages. That is, when the engine misfires, an abnormal temperature rise occurs thus to possibly cause a fire in the car. For this, a precise safety apparatus must be installed. Further, this system is large and complicated in structure and requires heat-resisting material and noble metal for constructing it. Therefore, the manufacturing cost thereof is high. Additionally, it may give rise to a secondary public nuisance, although it is effective when preventing a primary public nuisance. Moreover, it requires periodical maintenance and changing of parts. Especially, in the case of the catalytic converter system, the special fuel- (unleaded gasoline) must be used and when the engine is insufficiently warmed, no reduction of the pollutants in the exhaust gas is effected and, more adversely, the poisonous gases may increase.

It is well known how the components of exhaust gas are affected by various factors controlling the engine operation, for example, the shape of combustion chambers, air-fuel ratio ignition timing, timing of valve action, or the heat retention of exhaust pipes. Many exhaust emission control devices based on any of these factors have been proposed. These devices, however, are used just as an auxiliary device to the above mentioned systems, and have not yet provided satisfactory results of the reduction of the pollutants in exhaust gas.

SUMMARY OF THE INVENTION

Accordingly, an object of the present invention is to provide an internal combustion gasoline engine capable of reducing carbon monoxides, hydrocarbons, and nitrogen oxides in exhaust gases to a predetermined level without using any additional reaction chamber and any modification of the engine structure.

Another object of the present invention is to provide an exhaust emission control device for internal combustion gasoline engines which is simply constructed by just modifying the exhaust system for heat retaining and without any re-combustion chamber or catalytic converter.

To achieve these objects, the internal combustion engine has at least two cylinders of which the ports of the exhaust valves communicate with a common port passage in the cylinder head to provide a siamese port passage which in turn communicates with an exhaust pipe, a secondary air intake passage being connected to the siamese port passage for introducing the secondary air by exhaust pulsation, and heat insulation means are provided along the siamese port passage and the exhaust pipe.

The siamese port passage has the effect of maintaining the temperature of the exhaust gas passing therethrough to be at a high temperature, since each branch port passage is heated by the exhaust gases passing through the adjacent branch port passage, so that the branch passages are kept at a high temperature. Thus, oxidation of unburned harmful constituents may effectively occur. The exhaust passage through the insulated siamese port passage and the heat insulated exhaust pipe has a volume equal to the displacement volume of the corresponding cylinders for effective oxidation of the unburned constituents. Further, the ignition timing is retarded to restrict the combustion temperature to under 2000° C. for reducing the amount of nitrogen oxides.

Engine control factors, such as the ignition timing, are controlled to lower the combustion gas temperature in the cylinder, and the exhaust gas temperature in the exhaust passage is maintained at a high temperature, whereby the three harmful above-mentioned exhaust gas constituents can be decreased by controlling the gas temperatures in the cylinder and in the exhaust passage.

For a clearer understanding of the nature and objects of this invention, reference may be had to the following detailed description taken in connection with the accompanying drawings, in which:

DESCRIPTION OF THE DRAWINGS

FIG. 3 is a graph to illustrate the relationship between the concentrations of pollutants in the exhaust gas and the air fuel ratio, FIG. 4 is a graph of a relationship between the concentration of nitrogen oxides in the exhaust gas and the stroke-bore ratio.

FIG. 6 illustrates in graph form how the exhaust gas temperature varies with difference of the ignition timing.

DESCRIPTION OF THE PREFERRED EMBODIMENT

The inventors experimentally confirmed the fact that the combustion gas temperature and the exhaust gas temperature are indispensable to be taken into account in removal of the pollutants of the exhaust gas. For example, nitrogen oxides generally are produced at a high temperature and the ratio of increasing amount of the products of nitrogen oxides sharply increases at about 1,800° C. Carbon monoxide and hydrocarbons tends to self-react when the exhaust gas temperature reaches a predetermined level. Such self-reaction triggering temperature is about 750° C.

Figure 5:
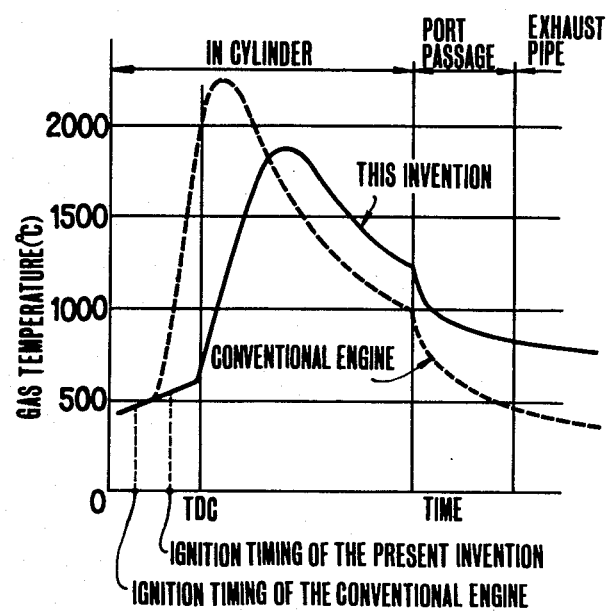
FIG. 5 is a graph showing temperature variation curves of the combustion gas and the exhaust gas of the present invention and the conventional engine.

With these facts in mind, when reading the graph in FIG. 5, it will easily be seen that the conventional engine is completely ineffective in reducing of the pollutants in exhaust gas. As indicated by the dotted line in FIG. 5, the combustion gas temperature is by far above 2,000° C. and then reduces to be 1,000° C. to 1,200° C., and the temperature of the gas exhausted to the exhaust port passage through the exhaust valve port further reduces to 350° C. to 800° C. That is, the amount of nitrogen oxides generated is very large because of a high combustion temperature, and unclean exhaust gas including carbon monoxide and hydrocarbons are emitted to the exterior since the temperature of the gas exhausted to the exhaust system suddenly falls below the self-reaction triggering temperature.

Another experiment by the inventors confirmed the following facts, as shown in FIG. 3. First, carbon monoxide reduces in proportion to the air fuel ratio, and its reduction stops in the vicinity of the stoichiometric ratio (14.7). The amount of hydrocarbons is reduced with an increase of the air-fuel ratio and is increased as the air-fuel ratio increases over the stoichiometric ratio. Second, nitrogen oxides increase with increase of the A/F ratio and reaches the peak near the stoichiometric, and then decreases with an increase of the A/F ratio.

Other experiments by the inventors show that the amount of the nitrogen oxides in the exhaust gas was proportionally related to the ratio of the piston stroke to the cylinder bore, as shown in FIG. 4, and the exhaust gas temperature exhibited a tendency of increase with retardation of the ignition timing, as shown in FIG. 6, the details of which will be referred to later. Incidentally, the exhaust gas temperature in the FIG. 6 experiment was measured in accordance with the 10 mode measuring method, Japanese Exhaust Emission Test Procedure.

The present invention is based on all of these experimental facts. In the present invention, the port passage in the cylinder head is formed into a siamese port passage communicating with the adjacent cylinders. The stroke-bore ratio of the engine is small. A heat insulating means is provided along the inner wall of the siamese port passage in the cylinder head. The exhaust pipe is also provided with a heat insulation structure. The ignition timing is so timed that the combustion gas temperature in the conbustion chamber is below 2,000° C. With such construction, the exhaust gas temperature is maintained above 750° C. over a volume of the exhaust passage following the exhaust valve port corresponding in amount to the engine displacement volume. In the present invention, these features mentioned above are systematically cooperatively combined so that the gas temperature distribution from the cylinder to the exhaust valve becomes more effective for reduction of the pollutants in exhaust gas, as indicated by the solid line in FIG. 5. It is to be noted that the ratio of surface area to volume in the combustion chamber may be made large for effecting a slower rate of combustion, and the exhaust valve, may set to open near the bottom dead center so as to retain the combustion gas in the combustion chamber for a long time for promoting oxidation in the cylinder.

Figure 1:
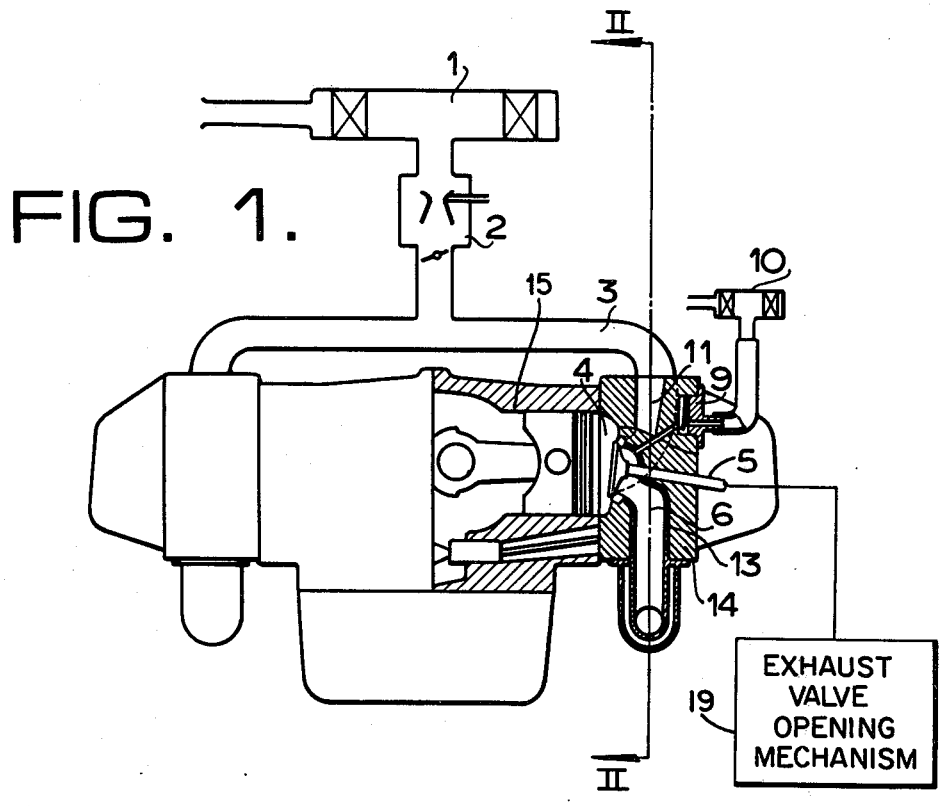
FIG. 1 is a part sectional view of an internal combustion gasoline engine according to this invention.
Figure 2:
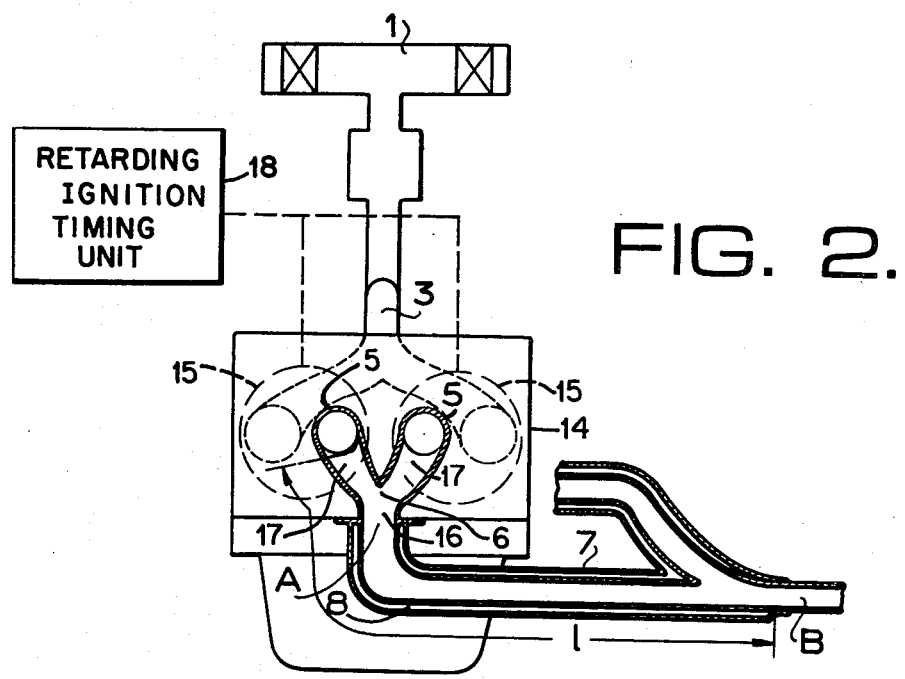
FIG. 2 is a cross sectional view taken along line II—II.

Referring now to FIGS. 1 and 2, there is shown an internal combustion gasoline engine of the type of a horizontal opposed-piston engine of which each bank is provided with two cylinders 15 incorporating the present invention, having an air cleaner 1 and a carburetor 2 as conventional, but improved so as to supply a relatively lean air fuel mixture (15 to 20 of the air-fuel ratio) to the engine. There are provided an intake tube 3 and a combustion chamber 4 which is of a flat shaped type with about 4 cm$^{-1}$ ratio of surface area to volume (S/V). Both exhaust valves 5 and 5 of the cylinders in each bank are arranged adjacent to each other and both exhaust valve ports communicate with a common port passage 16 in the cylinder head 14, each via a branch port passage 17, to provide a siamese port passage 6. The siamese port passage 6 is provided with a liner 13 extending from the exhaust valve port to the common outlet of the siamese port passage 6. Reference numeral 8 designates an exhaust pipe following the siamese port passage 6. The exhaust tube 8 is covered with a heat insulating pipe 7 over a region thereof. The heat insulated exhaust passage "1" comprising the siamese port passage 6 and the heat insulated region of the exhaust pipe 8 has a volume equal to the displacement volume of the corresponding cylinders. According to our experiments it is preferable to design the heat-retaining portion in the exhaust passage to physically correspond to the engine displacement volume. By such construction of the exhaust passage, the exhaust gas passing therethrough is heat-retained over this length of the exhaust passage. Further, as shown in FIG. 6 the exhaust system provided with the above liner and the heat-retaining means provides by far a higher exhaust gas temperature at both the A and B portions shown in FIG. 2, when compared with that in the exhaust system without the liner and the heat-insulating means. Moreover, in this invention, the ignition timing is adjusted to be retarded somewhat (10° to 20° of crank angle) from the minimum advance for best torque (MBT).

As described above, the air fuel mixture supplied is a lean mixture with the air fuel ratio (15 to 20) larger than the stoichiometric A/F ratio (14.7). The result is that, as seen from FIG. 3, the pollutants of carbon monoxide and hydrocarbons are reduced and the oxidation in the exhaust gas continues since a relatively large amount of oxygen resides in the exhaust gas. For further, improving such a reduction process of the pollutants, the ignition timing is delayed by a retarding ignition timing unit 18, thereby to raise the exhaust gas temperature, as shown in FIG. 6, and the port liner 13 and heat-retaining means are employed. As a result, the self-reaction of the pollutants, carbon monoxides and hydrocarbons, continues and the oxidation rapidly progresses, resulting in a remarkable reduction of carbon monoxide and hydrocarbons. With respect to the shape of the combustion chamber, the S/V ratio is designed to be large so that the combustion chamber has a flat shaped space with a long flame propagation space. Therefore, the combustion in the combustion chamber mildly progresses, so that the maximum combustion temperature may be lowered, thereby reducing remarkably the amount of the nitrogen oxides in the exhaust gas. Such slow rate combustion causes the temperature of the combustion gas when exhausted from the exhaust value to rise with the result that the oxidation is further promoted in the port passage and the exhaust pipe. Moreover, the ignition timing is set to be delayed as compared with the conventional engine and thus the maximum combustion temperature is restricted low. Accordingly, this, together with the unique shape of the combustion chamber, serves to further reduce the amount of the nitrogen oxides in the exhaust gase. This also facilitates the oxidation of carbon monoxide and hydrocarbons.

sage 6 is provided in the cylinder head 14, a high heat maintainance effect may be expected and it is not necessary to provide an external, complex exhaust manifold, whereby the exhaust passage and exhaust pipe 8 are simplified and manufactured easily.

The following table shows the result of the internal combustion gasoline engine according to the present invention in comparison with the conventional one. Comparison is made with respect to three poisonous components in the exhaust gas and the temperatures at different places in the exhaust system. Measurement for this comparison was made according to the Japanese Exhaust Emission Test Procedure, 10 mode measuring method.

|  | Exhaust Gas Temperature (10 M Test.) | | Amount of Exhaust Gas | | |
| --- | --- | --- | --- | --- | --- |
|  | A Portion | B Portion | CO | HC | NOX |
| Conventional Engine | 600° C. | 350° C. | 12 g/Km | 2.2 g/Km | 1.8 g/Km |
| Engine of This Invention | 800° C. | 750° C. | 1.8 g/Km Mean | 0.15 g/Km Mean | 0.9 g/Km Mean |
| '75 Emission Standard (20 M) Japan) |  |  | 2.10 | 0.25 | 1.20 |
| Evaluation | In conventional engine, heat dispersion is large. Engine of this invention has a remarkable heat-retaining. | | Reduction of about 85% | Reduction of about 93% Fulfils '75 emission regulations | Reduction of about 50% |

As previously described, the retardation of the ignition timing causes the exhaust temperature to rise, as shown in FIG. 5 thereby to provide a good condition for the oxidation after the gas is exhausted. The port passage 6 is wholly lined with the liner 13 which ends near the exhaust valve seat. The liner 13 serves to impede the transfer of heat to the cylinder head 14 and thus the fall of the exhaust temperature may be controlled to a minimum. The gas exhausted from the cylinder in response to the opening of the exhaust valve is most intensively oxidized in the port passage and is continuously oxidized in the exhaust pipe being maintained at a given temperature, thereby extremely reducing the pollutants in the exhaust gas. This results from the fact that the liner 13 is provided over the inner wall of the port passage and the exhaust valve is heat-insulated for heat retention so that the exhaust gas temperature may be maintained in the temperature range permitting the oxidation, i.e. above 750° C.

It should be noted that the two exhaust valves 5 and 5 of the adjacent cylinders 15 and 15 are arranged adjacent each other and both adjacent exhaust valve ports of the respective adjacent exhaust valves 5 and 5 communicate with the common port passage 16 via branch port passages 17 and 17, respectively, to form the siamese port passage 6 in the cylinder head 14. The siamese port passage has the advantage of reducing carbon monoxide and hydrocarbons. More particularly, each branch port passage 17 is heated by the other adjacent branch port passage 17, since both branch port passages 17 and 17 are closely disposed next to each other. Therefore, the exhaust gases passing through the branch port passages may be maintained at a high temperature, so that oxidation of CO and HC may be further enhanced. In addition, since the siamese port pas- As seen from the above table, the three poisonous components of nirogen oxides, carbon monoxide and hydrocarbons are substantially reduced and the result of the reduction thereof satisfactorily fulfils the requirements of the Japan's strict 1975 emission standards.

The engine of this invention with the additional known exhaust gas recirculation device can meet the more strict emission regulations to be enforced after 1975.

As seen from FIG. 4, the engine with the small ratio of stroke to bore is effective in nitrogen oxide reduction because, in this case, the flaming distance is large and the combustion of the gas in the cylinder continues for a long time (see FIG. 4).

In case the exhaust value is set so as to open at 50° before the bottom dead center to 20° after bottom dead center by mechanism 19 therefor (although, in the case of the conventional one, it is opened at 47° to 60° before the bottom dead center) and additionally the ignition timing is delayed, the combustion gas at a high temperature may remain in the combustion chamber for a long time with the result of facilitating oxidation.

A known air injection system for secondary air supply may partly be used in the engine of this invention. The data results from many experiments by inventors which showed that there was no need for a secondary air supply for the reason that the A/F ratio is large when the car runs at a light load, i.e. it runs on a level road at a normal speed. On the other hand, when the car runs at a heavy load (on the road of a high grade, for example), the A/F ratio of the mixture taken in is small. Thus, in this case, the supply of secondary air is necessary for increasing the A/F ratio.

To cope with this problem, the internal combustion gasoline engine is provided with an intake passage 11 for secondary air communicating with the exhaust port passage 6 with its opening near the exhaust valve 5 and also communicating with an air cleaner 10. A check valve 9 is disposed in the intake passage 11, and is operated by the pulsation of the exhaust gases to open when the inner pressure of the exhaust passage is lowered below the atmospheric pressure, and to close when the former rises above the latter. The negative pressure given by the pulsation results in introduction of secondary air from the air cleaner 10 into the exhaust passage. In this case, the check valve 9 may be used in a manner that it is interlocked with an accelerator pedal and secondary air is supplied immediately after or with some time dleay after operating the pedal. The check valve 9 may also be controlled in its opening in response to the change of the negative pressure in the intake passage. When the car runs at heavy load, the temperature of the exhaust gas is high. In such case, the supply of secondary air may be controlled on the basis of the change of the exhaust gas temperature.

Referring now to FIG. 5, the gas temperature of the present invention is compared with that of a conventional engine, whereby it may be noted that with the present invention the ignition timing is retarded to restrict the combustion gas temperature to under 2000° to reduce the amount of nitrogen oxides, and the exhaust passage temperature is maintained higher than that of the conventional engine to enhance the oxidation therein of CO and HC.

What is claimed is:

1. An exhaust gas purification system for internal combustion engines having at least two adjacent cylinders each defining a combustion chamber and a displacement volume thereof and each having an exhaust port communicating with the combustion chamber, respectively, comprising
  an exhaust valve in the exhaust port for each of said cylinders, respectively,
  a pair of the exhaust ports and a corresponding pair of said exhaust valves of the at least two adjacent cylinders, respectively, being arranged adjacent to each other,
  a cylinder head having therein a branch port passage communicating with and following the exhaust port of each of a corresponding of said exhaust valves, respectively, a pair of said branch port passages being adjacent one another and communicating with said pair of the adjacent exhaust ports and with said corresponding pair of said adjacent exhaust valves of the at least two adjacent cylinders, respectively,
  said cylinder head further having therein a common port passage communicatingly connected at one end thereof to both adjacent of said branch port passages of said pair of branch port passages forming therewith a siamese port passage,
  a secondary air intake passage means including a check valve communicating with said branch port passage near said exhaust valve for introducing secondary air into said branch port passage through said check valve by exhaust gas pulsations,
  an exhaust pipe connected to another end of said common port passage,
  said exhaust pipe having a constant cross-section portion of a fixed diameter over its length, without connection to any other exhaust pipe for effective introduction of the secondary air,
  heat insulation members disposed along said siamese port passage and along at least a region of said exhaust pipe, respectively, the total volume of said siamese port passage and said heat insulated region of said exhaust pipe being equal to the total displacement volume of the corresponding operatively communicating cylinders for effective oxidation of unburned exhaust gas constituents.

2. An exhaust gas purification system for internal combustion engines having at least two adjacent cylinders each defining a combustion chamber and a displacement volume thereof and each having an exhaust port communicating with the combustion chamber, respectively, comprising
  an exhaust valve in the exhaust port for each of said cylinders, respectively,
  a pair of the exhaust ports and a corresponding pair of said exhaust valves of the at least two adjacent cylinders, respectively, being arranged adjacent to each other,
  a cylinder head having therein a branch port passage communicating with and following the exhaust port of each of a corresponding of said exhaust valves, respectively, a pair of said branch port passages being adjacent one another and communicating with said pair of the adjacent exhaust ports and with said corresponding pair of said adjacent exhaust valves of the at least two adjacent cylinders, respectively,
  said cylinder head further having therein a common port passage communicatingly connected at one end thereof to both adjacent of said branch port passages of said pair of branch port passages forming therewith a siamese port passage,
  a secondary air intake passage means including a check valve communicating with said branch port passage near said exhaust valve for introducing secondary air into said branch port passage through said check valve by exhaust gas pulsations,
  an exhaust pipe connected to another end of said common port passage,
  said exhaust pipe having a constant cross-section portion of a fixed diameter over its length, without connection to any other exhaust pipe for effective introduction of the secondary air,
  heat insulation members disposed along said siamese port passage and along at least a region of said exhaust pipe, respectively, the total volume of said siamese port passage and said heat insulated region of said exhaust pipe being equal to the total displacement volume of the corresponding operatively communicating cylinders for effective oxidation of unburned exhaust gas constituents, and
  a retarded ignition timing means for restricting combustion temperature in the cylinders to under 2000° C. during combustion.

3. An exhaust gas purification system for internal combustion engines having at least two adjacent cylinders each defining a combustion chamber and a displacement volume thereof and each having an exhaust port communicating with the combustion chamber, respectively, comprising
  an exhaust valve in the exhaust port for each of said cylinders, respectively,
  a pair of the exhaust ports and a corresponding pair of said exhaust valves of the at least two adjacent cylinders, respectively, being arranged adjacent to each other, a cylinder head having therein a branch port passage communicating with and following the exhaust port of each of a corresponding of said exhaust valves, respectively, a pair of said branch port passages being adjacent one another and communicating with said pair of the adjacent exhaust ports and with said corresponding pair of said adjacent exhaust valves of the at least two adjacent cylinders, respectively, said cylinder head further having therein a common port passage communicatingly connected at one end thereof to both adjacent of said branch port passages of said pair of branch port passages forming therewith a siamese port passage, a secondary air intake passage means including a check valve communicating with said branch port passage near said exhaust valve for introducing secondary air into said branch port passage through said check valve by exhaust gas pulsations, an exhaust pipe connected to another end of said common port passage, said exhaust pipe having a constant cross-section portion of a fixed diameter over its length, without connection to any other exhaust pipe for effective introduction of the secondary air, heat insulation members disposed along said siamese port passage and along at least a region of said exhaust pipe, respectively, the total volume of said siamese port passage and said heat insulated region of said exhaust pipe being equal to the total displacement volume of the corresponding operatively communicating cylinders for effective oxidation of unburned exhaust gas constituents, and means for opening said exhaust valve within a range from 50° before bottom dead center to 20° after bottom dead center for obtaining a long residence time of combustion gases in the cylinder to enhance the oxidation of the constituents of the gases.

4. An exhaust gas purification system for internal combusion engines having at least two adjacent cylinders each defining a combustion chamber and a displacement volume thereof and each having an exhaust port communicating with the combustion chamber, respectively, comprising an exhaust valve in the exhaust port for each of said cylinders, respectively, a pair of the exhaust ports and a corresponding pair of said exhaust valves of the at least two adjacent cylinders, respectively, being arranged adjacent to each other, a cylinder head having therein a branch port passage communicating with and following the exhaust port of each of a corresponding of said exhaust valves, respectively, a pair of said branch port passages being adjacent one another and communicating with said pair of the adjacent exhaust ports and with said corresponding pair of said adjacent exhaust valves of the at least two adjacent cylinders, respectively, said cylinder head further having therein a common port passage communicatingly connected at one end thereof to both adjacent of said branch port passages of said pair of branch port passages forming therewith a siamese port passage, a secondary air intake passage means including a check valve communicating with said branch port passage near said exhaust valve for introducing secondary air into said branch port passage through said check valve by exhaust gas pulsations, an exhaust pipe connected to another end of said common port passage, said exhaust pipe having a constant cross-section portion of a fixed diameter over its length, without connection to any other exhaust pipe for effective introduction of the secondary air, heat insulation members disposed along said siamese port passage and along at least a region of said exhaust pipe, respectively, the total volume of said siamese port passage and said heat insulated region of said exhaust pipe being equal to the total displacement volume of the corresponding operatively communicating cylinders for effective oxidation of unburned exhaust gas constituents, a retarding ignition timing means for restricting combustion temperature in the cylinders to under 2000° C. during combustion, and means for opening said exhaust valve within a range from 50° before bottom dead center to 20° after bottom dead center for obtaining a long residence time of combustion gases in the cylinder to enhance the oxidation of the constituents of the gases.

* * * * *

UNITED STATES PATENT AND TRADEMARK OFFICE
CERTIFICATE OF CORRECTION

PATENT NO. : 4,160,364
DATED : July 10, 1979
INVENTOR(S) : Haruo MORI et al

It is certified that error appears in the above-identified patent and that said Letters Patent are hereby corrected as shown below:

Column 4, line 54 after "further" the comma "," should be deleted.

Column 6, line 48 "value" should be --valve-- .

Column 7, line 14 "dleay" should be --delay--.

Signed and Sealed this

Ninth Day of October 1979

[SEAL]

Attest:

RUTH C. MASON
Attesting Officer

LUTRELLE F. PARKER
Acting Commissioner of Patents and Trademarks